United States Patent
Liao et al.

(10) Patent No.: US 11,832,628 B2
(45) Date of Patent: Dec. 5, 2023

(54) POLYMER FILM FOR PRESERVATION OF FRUITS AND VEGETABLES

(71) Applicant: NAN YA PLASTICS CORPORATION, Taipei (TW)

(72) Inventors: Te-Chao Liao, Taipei (TW); Chun-Che Tsao, Taipei (TW); Chen-Ho Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 263 days.

(21) Appl. No.: 16/886,978

(22) Filed: May 29, 2020

(65) Prior Publication Data
US 2021/0084921 A1 Mar. 25, 2021

(30) Foreign Application Priority Data
Sep. 25, 2019 (TW) .................. 108134620

(51) Int. Cl.
*A23B 7/157* (2006.01)
*B65D 85/34* (2006.01)
(Continued)

(52) U.S. Cl.
CPC .............. *A23B 7/157* (2013.01); *B65D 65/38* (2013.01); *B65D 81/24* (2013.01); *B65D 85/34* (2013.01);
(Continued)

(58) Field of Classification Search
CPC ........ A23B 7/157; B65D 85/34; B65D 81/24; B65D 65/38
(Continued)

(56) References Cited

U.S. PATENT DOCUMENTS

2007/0107836 A1* 5/2007 Gibberd ................ B65B 25/023
156/244.11
2008/0299380 A1 12/2008 Choi et al.
(Continued)

FOREIGN PATENT DOCUMENTS

CN 1686762 A * 10/2005
CN 1686762 A 10/2005
(Continued)

OTHER PUBLICATIONS

Machine_English translation_CN_107266820_A1; Peng Changan; High-strength food fresh-keeping film and preparation method thereof; Oct. 20, 2017; EPO; whole document (Year: 2017).*
(Continued)

*Primary Examiner* — Tahseen Khan
(74) *Attorney, Agent, or Firm* — Li & Cai Intellectual Property (USA) Office

(57) ABSTRACT

A polymer film for storing fruits and vegetables includes a first polymer resin material, a second polymer resin material, and an inorganic nano powder material. The first polymer resin material has a first molecular weight. The second polymer resin material has a second molecular weight. The first molecular weight is less than the second molecular weight. The first polymer resin material and the second polymer resin material are blended with each other according to a predetermined weight ratio so that the polymer film has a gas penetration rate between 3.5 $g/m^2/day$ to 35 $g/m^2/day$. The inorganic nano powder material includes zinc oxide (ZnO). The inorganic nano powder material is dispersed in the first polymer resin material and the second polymer resin material in a plurality of granular forms, and an average particle size of the inorganic nano powder material is between 50 nm and 200 nm.

12 Claims, 6 Drawing Sheets

(51) Int. Cl.
  *B65D 65/38* (2006.01)
  *B65D 81/24* (2006.01)
  *C08J 5/18* (2006.01)
(52) U.S. Cl.
  CPC .............. *C08J 5/18* (2013.01); *A23V 2002/00* (2013.01); *C08J 2323/06* (2013.01); *C08J 2323/12* (2013.01); *C08J 2423/06* (2013.01); *C08J 2423/12* (2013.01)
(58) Field of Classification Search
  USPC ......................................................... 428/220
  See application file for complete search history.

(56) References Cited

U.S. PATENT DOCUMENTS

2015/0314941 A1* 11/2015 Ramadas ............... B65D 85/38
  428/326
2016/0009428 A1* 1/2016 Groeneweg .......... B23K 26/032
  426/232

FOREIGN PATENT DOCUMENTS

| | | | | |
|---|---|---|---|---|
| CN | 101012018 | A | | 8/2007 |
| CN | 101979432 | A | | 2/2011 |
| CN | 106674576 | A | | 5/2017 |
| CN | 107266820 | A * | 10/2017 | |
| CN | 107266820 | A | | 10/2017 |
| CN | 108503932 | A | | 9/2018 |
| CN | 109593245 | A * | 4/2019 | ......... A01G 13/0275 |
| TW | 370491 | B | | 9/1999 |

OTHER PUBLICATIONS

Machine_english_translation_CN_1686762_A; Wang, M; Air regulating storage antistaling bag for fruit and vegetable; Oct. 26, 2005; EPO; whole document (Year: 2005).*

Machine_English_translation_CN_109593245_A; Sheng, Sep. 4, 2019; EPO; whole document (Year: 2023).*

* cited by examiner

POLYMER FILM FOR PRESERVATION OF FRUITS AND VEGETABLES

CROSS-REFERENCE TO RELATED PATENT APPLICATION

This application claims the benefit of priority to Taiwan Patent Application No. 108134620, filed on Sep. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polymer film, and more particularly to a polymer film for preservation of fruits and vegetables.

BACKGROUND OF THE DISCLOSURE

Fruits and vegetables are essential foods for humans. Fruits and vegetables are rich in dietary fiber, vitamins, and minerals. Fruits and vegetables have health benefits such as increasing satiety, improving gastrointestinal motility, and reducing cholesterol in the blood. In addition, fruits and vegetables are also nutrients needed to maintain human health. Many research reports indicate that one of the main causes of chronic diseases is insufficient intake of fruits and vegetables. The World Health Organization (WHO) and many developed countries have listed vegetable and fruit intake as one of the important advocacies, and encourage people to eat more fruits and vegetables. It can be seen that the importance of fruits and vegetables to human health and their nutritional characteristics have become more and more important.

The main difference between fruits and vegetables and other foods is that fruits and vegetables are still living organisms, which are easily affected by factors such as temperature, humidity, and microorganisms to cause decay. Therefore, the fresh preservation of fruits and vegetables is very important. At the present time, the more common methods of fresh preservation of fruits and vegetables are refrigerated storage and controlled atmosphere storage (CA storage). Refrigerated storage is simple and easy to implement, but does not provide a complete way to improve the short on-shelf period of fruits and vegetables in the market and the decay of fruits and vegetables during transportation. The modified atmosphere fresh-keeping bags used in the controlled atmosphere storage still have the following problems. For example, when fruits and vegetables are stored in the modified atmosphere fresh-keeping bags, the fruits and vegetables may release aging hormones such as ethylene aging hormone during metabolism, these aging hormones may accumulate in the bags and cannot dissipate, which will accelerate the withering of fruits and vegetables, and which is not conducive to storage and preservation. The raw material of the modified atmosphere fresh-keeping bags cannot inhibit bacteria and mildew. Fruits and vegetables are prone to mold and spoilage during storage. In addition, there is a limitation on the gas permeability of the raw material. For fruits and vegetables with different breathing amounts, it is necessary to prepare different fresh-keeping bags with different resin materials to adjust the gas in the bags to a suitable composition. Finally, some multi-layered food packaging materials can be used to keep fruits and vegetables fresh, but the process is complex and expensive.

SUMMARY OF THE DISCLOSURE

In response to the above-referenced technical inadequacies, the present disclosure provides a polymer film for preservation of fruits and vegetables.

In one aspect, the present disclosure provides a polymer film for preservation of fruits and vegetables. The polymer film includes a first polymer resin material, a second polymer resin material, and an inorganic nano powder material. The first polymer resin material has a first molecular weight. The second polymer resin material has a second molecular weight. The first molecular weight is less than the second molecular weight. The first polymer resin material and the second polymer resin material are blended with each other according to a predetermined weight ratio so that the polymer film has a gas penetration rate of between 3.5 $g/m^2/day$ and 35 $g/m^2/day$. The inorganic nano powder material includes zinc oxide (ZnO). The inorganic nano powder material is dispersed in the first polymer resin material and the second polymer resin material in a plurality of granular forms, and an average particle size of the inorganic nano powder material is between 50 nm and 200 nm.

In another aspect, the present disclosure provides a polymer film for preservation of fruits and vegetables. The polymer film includes a first polymer resin material, a second polymer resin material, and an inorganic nano powder material. The first polymer resin material has a first density. The second polymer resin material has a second density. The first density is less than the second density. The first polymer resin material and the second polymer resin material are blended with each other according to a predetermined weight ratio so that the polymer film has a gas penetration rate of between 3.5 $g/m^2/day$ and 35 $g/m^2/day$. The inorganic nano powder material includes zinc oxide (ZnO). The inorganic nano powder material is dispersed in the first polymer resin material and the second polymer resin material in a plurality of granular forms, and an average particle size of the inorganic nano powder material is between 50 nm and 200 nm.

Therefore, the polymer film for preservation of fruits and vegetables of the present disclosure has better abilities of fresh-keeping of fruits and vegetables, absorbing ethylene aging hormone, and inhibit bacteria and mildew by the technical features of "the first molecular weight is less than the second molecular weight (or the first density is less than the second density), and the first polymer resin material and the second polymer resin material are blended with each other according to a predetermined weight ratio so that the polymer film has a gas penetration rate of between 3.5 $g/m^2/day$ and 35 $g/m^2/day$" and "an inorganic nano powder material including zinc oxide (ZnO); wherein the inorganic nano powder material is dispersed in the first polymer resin material and the second polymer resin material in a plurality of granular forms, and an average particle size of the inorganic nano powder material is between 50 nm and 200 nm".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
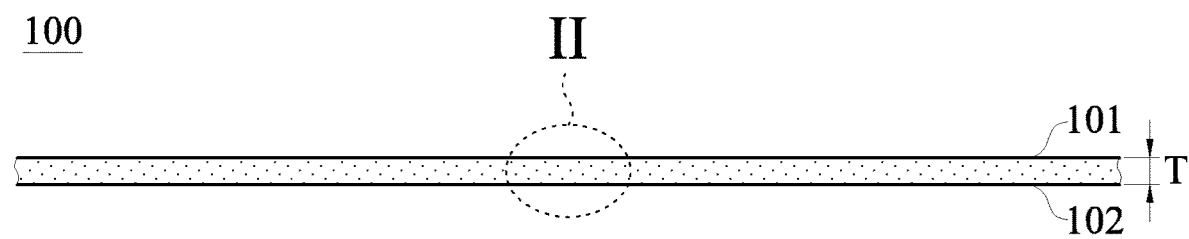
FIG. 1 is a schematic view of a polymer film for preservation of fruits and vegetables according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
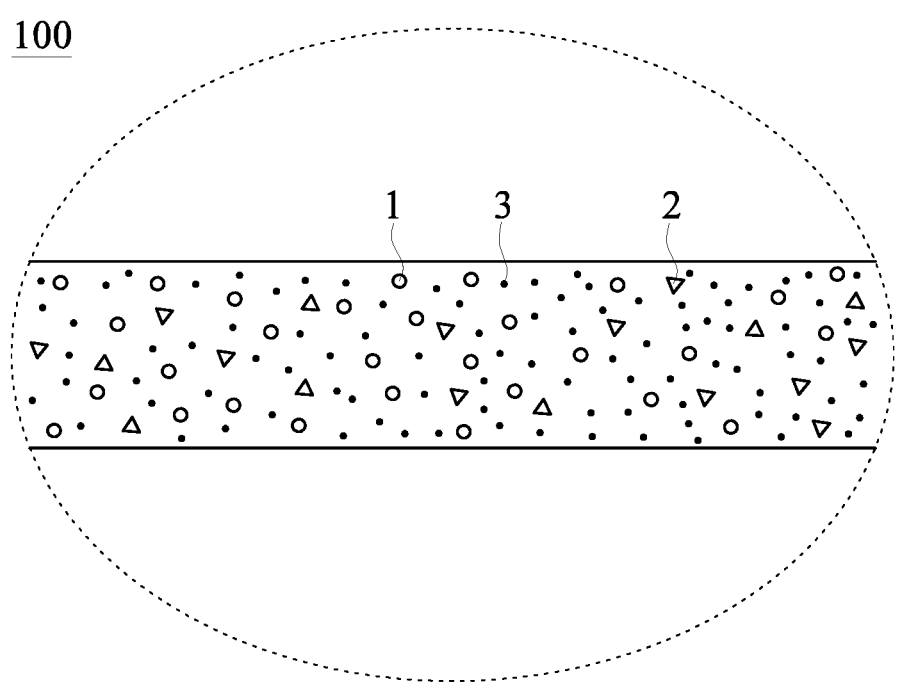
FIG. 2 is a partially enlarged view of the region II in FIG. 1.
Figure 5:
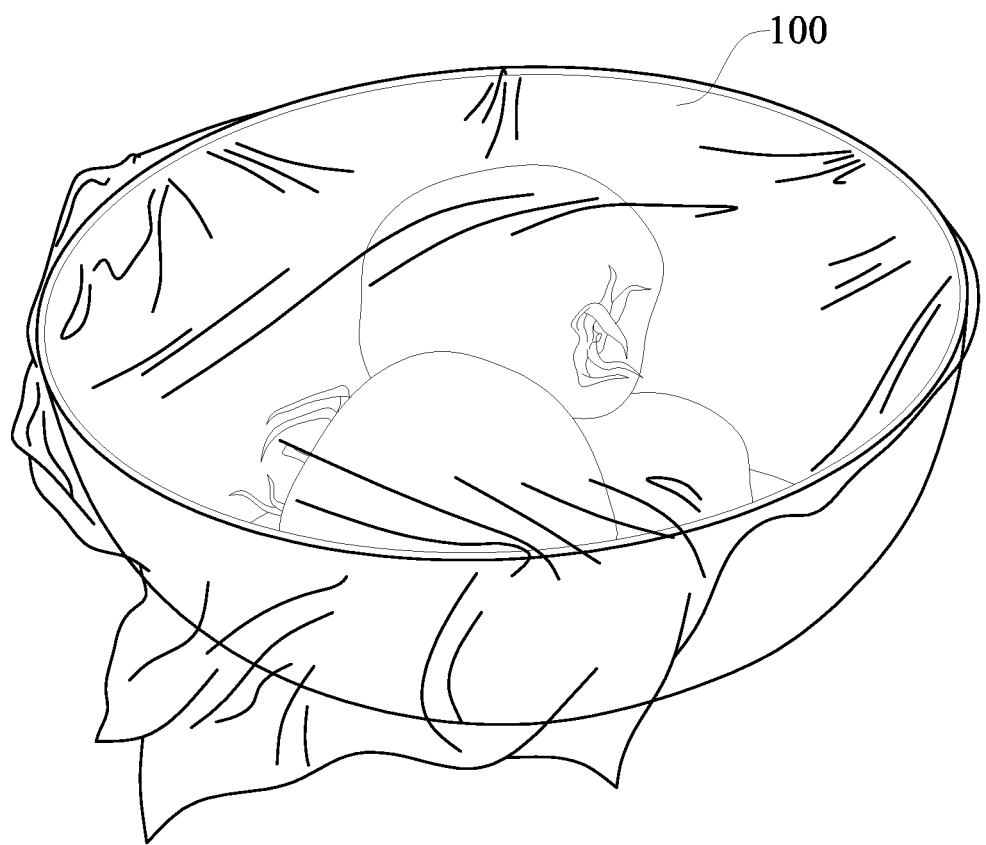
FIG. 5 is a schematic view of a polymer film in the shape of a thin film for sealing fruits and vegetables on a vessel.
Figure 6:
FIG. 6 is a schematic view of a polymer film in the shape of a bag for packaging fruits and vegetables.

Referring to FIG. 1 and FIG. 2, a first embodiment of the present disclosure is illustrated. The present embodiment provides a polymer film 100, in particular a polymer film 100 for preservation of fruits and vegetables. The polymer film 100 can be, for example, in the shape of a thin film to seal fruits and vegetables on a container (as shown in FIG. 5), or in the shape of a bag for packaging fruits and vegetables (as shown in FIG. 6), thereby achieving the effect of fresh keeping of fruits and vegetables.

An object of the present disclosure is to solve the problem existing in the related art that ethylene aging hormone easily accumulate in a sealed space of a fresh-keeping bag (or a fresh-keeping film), which is not beneficial to the fresh-keeping of fruits and vegetables.

Another object of the present disclosure is to solve the problem existing in the related art that the fresh-keeping bag (or the fresh-keeping film) does not have the ability of inhibiting bacteria and mildew, which is not beneficial to the fresh-keeping of fruits and vegetables.

Yet another object of the present disclosure is to solve the problem existing in the related art that the fresh-keeping bag (or the fresh-keeping film) cannot adjust the gas in the sealed space to a suitable composition for fruits and vegetables with different breathing amounts, and the fresh-keeping bag (or the fresh-keeping film) cannot be applied at the fresh-keeping of various types of fruits and vegetables at the same time.

Still another object of the present disclosure is to solve the problem existing in the related art that the fresh-keeping bag (or the fresh-keeping film) with multi-layered structure has a complicated manufacturing process and a high manufacturing cost.

In addition, the breathing, evapotranspiration, and maturation of fruits and vegetables after harvesting will cause nutrient consumption, water dispersion, and increase of hormones of fruits and vegetables, which will accelerate the aging and withering of fruits and vegetables and their quality. Therefore, in order to solve the above technical problems, still another object of the present disclosure is to extend the period of fresh-keeping of fruits and vegetables.

In order to achieve the above objects, in the present embodiment, the polymer film 100 is mixed with polymer resin materials having different molecular weights, so that the polymer film 100 can achieve a desired gas permeability. Therefore, when storing fruits and vegetables, the gas composition in the sealed space of the fresh-keeping bag (or the fresh-keeping film) can be adjusted to a suitable concentration.

In addition, in the present embodiment, the polymer film 100 is mixed with an inorganic nano powder material to absorb ethylene aging hormone and to inhibit bacteria and mildew.

More specifically, as shown in FIG. 1 and FIG. 2, the polymer film 100 for preservation of fruits and vegetables includes a first polymer resin material 1 and a second polymer resin material 2. The first polymer resin material 1 has a first molecular weight. The second polymer resin material has a second molecular weight. The first molecular weight is less than the second molecular weight. In addition, the first polymer resin material 1 and the second polymer resin material 2 are blended with each other according to a predetermined weight ratio so that the polymer film 100 has a gas penetration rate of between 3.5 $g/m^2/day$ and 35 $g/m^2/day$. Accordingly, when storing fruits and vegetables, the gas composition in the sealed space of the fresh-keeping bag (or the fresh-keeping film) can be adjusted to a suitable concentration.

In terms of molecular weights of polymer resin materials, the first molecular weight of the first polymer resin material 1 is usually between 10,000 and 20,000, preferably between 15,000 and 20,000, and more preferably between 16,000 and 19,000. The second molecular weight of the second polymer resin material 2 is usually between 20,000 and 40,000, preferably between 25,000 and 35,000, and more preferably between 28,000 and 32,000.

In terms of usage amounts of polymer resin materials, the first polymer resin material 1 and the second polymer resin material 2 are blended with each other according to the weight ratio of between 1:9 and 9:1, so that the polymer film 100 has the gas penetration rate of between 3.5 $g/m^2/day$ and 35 $g/m^2/day$. Preferably, the first polymer resin material 1 and the second polymer resin material 2 are blended with each other according to the weight ratio of between 3:7 and 7:3, so that the polymer film 100 has the gas penetration rate of between 5 $g/m^2/day$ and 25 $g/m^2/day$.

For example, in an embodiment of the present disclosure, the first polymer resin material 1 is polyethylene (PE) having a molecular weight of between 16,000 and 19,000. The second polymer resin material 2 is polypropylene (PP) having a molecular weight of between 28,000 and 32,000. The first polymer resin material 1 and the second polymer resin material 2 are mixed with each other according to a weight ratio range of between 3:7 and 7:3. Accordingly, the polymer film 100 has a gas penetration rate of between 5 $g/m^2/day$ and 25 $g/m^2/day$.

It is worth mentioning that the molecular weights and usage amounts of the first and second polymer resin materials need to be within the above-defined ranges, so that the polymer film 100 can have the desired gas permeability. If the molecular weights and usage amounts exceed the above-defined ranges, the polymer film 100 will not have the desired gas permeability, so that the gas composition in the sealed space of the fresh-keeping bag (or the fresh-keeping film) cannot be effectively adjusted.

It should be noted that the gas permeability may be, for example, oxygen ($O_2$) permeability, carbon dioxide ($CO_2$) permeability, or water vapor ($H_2O$) permeability.

Since fruits and vegetables are still living organisms after harvest, the fruits and vegetables will continue to breathe (i.e. absorb oxygen and release carbon dioxide) when they are stored, and the moisture of the fruits and vegetables will continue to evaporate. If in the sealed space of the fresh-keeping bag (or the fresh-keeping film), the carbon dioxide concentration is too high, the oxygen concentration is too low, or the water vapor is evaporating too quickly, it will cause the nutrient consumption of fruits and vegetables, the water dispersion loss, and the increase in the concentration of fruits and vegetables hormones, which will accelerate the aging and withering of fruits and vegetables and reduce their quality.

The feature of the present disclosure is that the polymer film 100 is mixed with the polymer resin materials having different molecular weights, so that the polymer film 100 can achieve the desired gas permeability. Accordingly, the gas composition in the sealed space of the fresh-keeping bag (or the fresh-keeping film) can be adjusted to a suitable concentration, such as: oxygen gas enters the sealed space, carbon dioxide gas exits the sealed space, and moisture is kept in the sealed space, thereby effectively solving the above technical problems.

Furthermore, in terms of material selections of polymer resin materials, the first polymer resin material 1 is at least one material selected from the group consisting of polyethylene (PE), polypropylene (PP), polyvinyl chloride (PVC), polyvinylidene chloride (PVDC), polyester (PET), and polymethylpentene (PMP). The second polymer resin material 2 is at least one material selected from the group consisting of polyethylene (PE), polypropylene (PP), polyvinyl chloride (PVC), polyvinylidene chloride (PVDC), polyester (PET), and polymethylpentene (PMP). In addition, the polyethylene (PE) may be, for example, high density polyethylene (HDPE), low density polyethylene (LDPE), or linear low density polyethylene (LLDPE).

It is worth mentioning that, in an embodiment of the present disclosure, the polymer film 100 for preservation of fruits and vegetables may be, for example, a biaxially-oriented polypropylene film (BOPP film), a cast polypropylene film (CPP film, also called unstretched polypropylene film), or a polyethylene terephthalate film (PET film), but the present disclosure is not limited thereto.

In addition, in terms of film thickness, the polymer film 100 has a first surface 101 and a second surface 102 opposite to the first surface 101, and a distance between the first surface 101 and the second surface 102 is defined as a thickness T. The thickness T is usually between 10 micrometers and 60 micrometers, preferably between 20 micrometers and 40 micrometers, and more preferably between 20 micrometers and 30 micrometers.

If the thickness of a film material is too thin, the mechanical strength or tensile strength of the finally produced vegetable and fruit fresh-keeping bag (or fresh-keeping film) will be weakened, and the edges of the film material will easily break. If the thickness of the film material is too thick, the manufacturing cost of the vegetable and fruit fresh-keeping bag (or fresh-keeping film) will become too high, thereby reducing the price competitiveness. In addition, if the thickness of the film material is too thick, the gas permeability of the film material may also be affected, thereby affecting the effect of freshness preservation of fruits and vegetables.

Referring again to FIG. 1 and FIG. 2, in order to enable the fresh-keeping bag (or the fresh-keeping film) to have abilities of absorbing ethylene aging hormone and inhibiting bacteria and mildew, the fruit and vegetable fresh-keeping polymer film 100 of the present embodiment further includes an inorganic nano powder material 3, and the composition of the inorganic nano powder material 3 includes at least zinc oxide (ZnO). In addition, the composition of the inorganic nano powder material 3 is selectively mixed with silicon dioxide ($SiO_2$), titanium dioxide ($TiO_2$), or silver ions. The purpose of adding nano powders such as zinc oxide (ZnO) and silicon dioxide ($SiO_2$) is to enable the polymer film 100 to absorb ethylene aging hormones. The purpose of adding nano powders such as titanium dioxide ($TiO_2$) or silver ions is to enable the polymer film 100 to inhibit bacteria and mildew.

More specifically, the inorganic nano powder material 3 is dispersed in the first polymer resin material 1 and the second polymer resin material 2 in a plurality of granular forms. In addition, an average particle size of the inorganic nano powder material 3 is usually between 50 nanometers and 200 nanometers, preferably between 50 nanometers and 150 nanometers, and more preferably between 50 nanometers and 100 nanometers.

If the particle size of the powder material is higher than the upper limit of the above range, the inorganic nano powder material 3 will have poor ability of absorbing ethylene aging hormone due to the larger particle size and the smaller total surface area of the powder. Accordingly, the effect of fresh-keeping of fruits and vegetables will also deteriorate. If the particle size of the powder material is lower than the lower limit of the above range, the manufacturing cost of the powder material will become too high, which is not economical.

In terms of content range of the powder material, a content range of the zinc oxide (ZnO) in the inorganic nano powder material 3 is not less than 10 wt %, and more preferably between 10 wt % and 30 wt %.

In addition, based on a total weight of the polymer film being 100 wt %, a sum of contents of the first polymer resin material 1 and the second polymer resin material 2 is preferably not less than 80 wt %, and more preferably not less than 90 wt %. The content range of the inorganic nano powder material 3 is preferably not more than 10 wt %, and more preferably between 6 wt % and 10 wt %. Accordingly, the inorganic nano powder material 3 can be uniformly dispersed in the polymer resin materials, and the inorganic nano powder material 3 can fully exert their material characteristics.

It should be noted that if the content of the powder material is higher than the upper limit of the above range, the surface of the polymer film 100 may generate more crystal point defects, which may cause a poor appearance, and the manufacturing cost of the polymer film 100 may also be increased. If the content of the powder material is lower than the lower limit of the above range, the effects of the polymer film 100 on absorbing ethylene aging hormone and inhibiting bacteria and mildew may not be as expected, thereby affecting the fresh-keeping effects of fruits and vegetables.

In terms of film preparation, the polymer film 100 can be obtained by uniformly mixing the inorganic nano powder material 3 and the polymer resin materials, and then using a twin-screw extruder to produce freshness-preserving master-batches, and then using a plastic bag manufacturing technology or a plastic film manufacturing technology to obtain a vegetable and fruit fresh-keeping bag or a fresh-keeping film.

According to the above configuration, since the polymer film 100 of the present embodiment is added with the inorganic nano powder material 3, the phenomenon of aging and withering of fruits and vegetables can be effectively delayed, and the freshness and greenness of fruits and vegetables can be maintained, thereby maintaining the commercial value of fruits and vegetables. In addition, since the inorganic nano powder material 3 of the present embodiment includes nano-oxides such as zinc oxide (ZnO), the polymer film 100 can inhibit bacteria and mildew, thereby keeping the storage environment of fruits and vegetables clean, and effectively reducing the probability of moldy fruits and vegetables. Further, the fresh-keeping bag made of the polymer film 100 of the present embodiment can effectively adjust the composition of the gas in the fresh-keeping bag, thereby effectively delaying the phenomenon of aging and withering of fruits and vegetables. The polymer film 100 of the present embodiment can retain water and moisturize, thereby reducing the rate of water evaporation, maintaining the taste of fruits and vegetables, extending a freshness period of fruits and vegetables, and maintaining the crispness of fruits and vegetables. The polymer film 100 of the present embodiment can be directly used with the preparation technology of a plastic film or a bag body, and the manufacturing process thereof is simple and has industrial application value.

In short, the polymer film 100 for preservation of fruits and vegetables of the present embodiment has at least the following technical effects:

(1) The polymer film can absorb ethylene aging hormone, delay the aging and withering of fruits and vegetables, and maintain the freshness of fruits and vegetables. (2) The polymer film can inhibit bacteria and mildew, maintain the cleanliness of the storage environment of fruits and vegetables, and reduce the probability of moldy fruits and vegetables. (3) The polymer film can adjust the composition of the gas in the fresh-keeping bag, inhibit the breathing of fruits and vegetables, and delay the aging of fruits and vegetables. (4) The polymer film can retain water and moisturize, avoid dehydration of the fruits and vegetables, and thus maintain the crisp taste of the fruits and vegetables. (5) The polymer film can adopt the existing film and bag manufacturing technology, which has the advantages of simple manufacturing process and industrial mass production.

Second Embodiment

Figure 3:
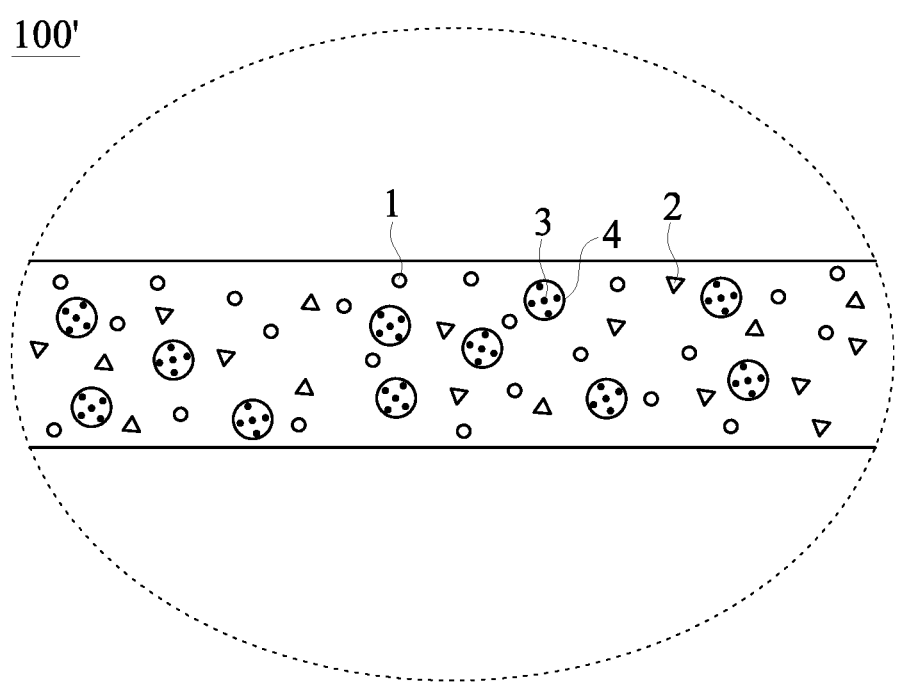
FIG. 3 is a partially enlarged view of a polymer film for preservation of fruits and vegetables according to a second embodiment of the present disclosure.

Referring to FIG. 3, a second embodiment of the present disclosure is illustrated. The present embodiment also provides a polymer film 100' for preservation of fruits and vegetables. The polymer film 100' of the present embodiment is substantially the same as the polymer film 100 of the first embodiment described above. The difference is that: the polymer film 100' of the present embodiment further includes a plurality of fresh-keeping master batches 4 which are dispersed in the first polymer resin material 1 and the second polymer resin material 2. Each of the fresh-keeping master batches 4 includes a third polymer resin material (not labeled in the figure), and the inorganic nano powder material 3 is dispersed in the third polymer resin material. The third polymer resin material is similar to the first and second polymer resin materials 1 and 2, and is at least one material selected from the group consisting of polyethylene (PE), polypropylene (PP), polyvinyl chloride (PVC), polyvinylidene chloride (PVDC), polyester (PET), and polymethylpentene (PMP).

Accordingly, the inorganic nano powder material 3 can be more uniformly dispersed in the first and second polymer resin materials 1 and 2.

Further, in the present embodiment, in order to increase the compatibility of the inorganic nano powder material 3 with the polymer resin materials, the composition of the fresh-keeping master batches 4 further includes a dispersant (i.e. a polymer-type copolymer dispersant, a silicon-containing dispersant, or a fluorine-containing dispersant), so that the inorganic nano powder material 3 can be more uniformly dispersed in the fresh-keeping master batches 4, but the present disclosure is not limited thereto.

Third Embodiment

Figure 4:
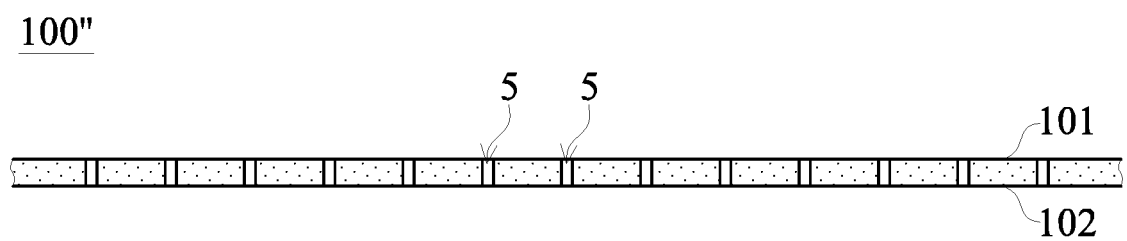
FIG. 4 is a partially enlarged view of a polymer film for preservation of fruits and vegetables according to a third embodiment of the present disclosure.

Referring to FIG. 4, a third embodiment of the present disclosure is illustrated. The present embodiment also provides a polymer film 100" for preservation of fruits and vegetables. The polymer film 100" of the present embodiment is substantially the same as the polymer film 100 of the first embodiment described above. The difference is that: the polymer film 100" of the present embodiment forms a plurality of laser penetration holes 5 in order to increase the gas permeability of the film material.

More specifically, the polymer film 100" of the present embodiment has a first surface 101 and a second surface 102 opposite to the first surface 101. The polymer film 100" forms a plurality of laser penetration holes 5 by laser drilling, and the plurality of laser penetration holes 5 respectively penetrate through the first surface 101 and the second surface 102. Further, a density distribution of the plurality of laser penetration holes on the polymer film 100" is preferably between 0.05 and 0.50 per square centimeter, and more preferably between 0.075 and 0.475 per square centimeter.

In addition, a hole size of each of the laser penetration holes 5 is preferably between 50 micrometers and 90 micrometers, and more preferably between 60 micrometers and 70 micrometers. Accordingly, the polymer film 100" has the gas penetration rate preferably not less than 10 g/m²/day, and more preferably not less than 15 g/m²/day.

It is worth mentioning that the polymer film 100" of the present embodiment is particularly suitable for preservation of fruits and vegetables with strong respiration. The polymer film 100" can effectively discharge the carbon dioxide accumulated in the bag body out of the bag body, and can effectively allow the oxygen outside the bag body to enter into the bag body.

Fourth Embodiment

A fourth embodiment of the present disclosure also provides a polymer film 100 for preservation of fruits and vegetables. The polymer film of the present embodiment is substantially the same as the polymer film of the first embodiment described above. The difference is that: in the present embodiment, the polymer film 100 is mixed with polymer resin materials having different "densities", so that the polymer film 100 can achieve a desired gas permeability. Therefore, when storing fruits and vegetables, the gas composition in the sealed space of the fresh-keeping bag (or the fresh-keeping film) can be adjusted to a suitable concentration.

More specifically, referring again to FIG. 1 and FIG. 2, the polymer film 100 for preservation of fruits and vegetables includes a first polymer resin material 1 and a second polymer resin material 2. The first polymer resin material 1 has a first density. The second polymer resin material has a second density. The first density is less than the second density. In addition, the first polymer resin material 1 and the second polymer resin material 2 are blended with each other according to a predetermined weight ratio, so that the polymer film 100 has a gas penetration rate of between 3.5 g/m²/day and 35 g/m²/day. Accordingly, when storing fruits and vegetables, the gas composition in the sealed space of the fresh-keeping bag (or the fresh-keeping film) can be adjusted to a suitable concentration.

In terms of densities of polymer resin materials, the first density of the first polymer resin material 1 is preferably between 0.85 g/cm³ and 0.94 g/cm³, and more preferably between 0.90 g/cm³ and 0.94 g/cm³. The second density of the second polymer resin material 2 is preferably between 0.94 g/cm³ and 1.40 g/cm³, and more preferably between 0.94 g/cm³ and 1.35 g/cm³.

For example, in an embodiment of the present disclosure, the first polymer resin material 1 is a low-density polyethylene (LDPE) having a density between 0.90 g/cm³ and 0.94 g/cm³. The second polymer resin material 2 is a high-density polyethylene (HDPE) having a density between 0.94 g/cm³ and 0.98 g/cm³. The first polymer resin material 1 and the second polymer resin material 2 are mixed with each other according to a weight ratio range of between 1:9 and 9:1. Accordingly, the polymer film 100 has a gas penetration rate of between 5 g/m²/day and 20 g/m²/day.

Experimental Test Results

In order to test the freshness-preserving effect of fruits and vegetables, various evaluation items are compared between the fresh-keeping films (also called cling films) made of the above four embodiments of the present disclosure and a general PE fresh-keeping film sold on the market.

The evaluation items include bacteriostatic ability, gas permeability, ethylene adsorption ability, moisture retention ability, mechanical strength, and tensile strength. The test methods and test results are described below.

The bacteriostatic ability is to use the fresh-keeping films made of the above four embodiments of the present disclosure and the general PE fresh keeping-film to package fruits and vegetables under the same film thickness, and compare the appearance changes of the fruits and vegetables over a period of time. The experimental results show that, after a period of time, the fruits and vegetables packaged by the general PE fresh-keeping film tend to be darkened or blackened from the edges of vegetable leaves. In comparison, the fruits and vegetables packaged by the fresh-keeping films made of the four embodiments of the present disclosure are not darkened or blackened, or are only slightly darkened or blackened. That is, the fresh-keeping films of the four embodiments of the present disclosure have better bacteriostatic ability.

The gas permeability of fresh-keeping film is tested by using MOCON machine (model 3/34G). The experimental results show that the fresh-keeping films made of the above four embodiments of the present disclosure are superior to the general PE fresh-keeping film in terms of gas permeability.

The ethylene adsorption ability of fresh-keeping film is tested by using FELIX INSTRUMENTS machine (model F-950). After the fruits and vegetables are packaged by the fresh-keeping film, the lower the ethylene concentration in the sealed space is, the better the ethylene adsorption ability of the fresh-keeping film is, which can help slow down the aging of fruits and vegetables and extend a freshness preservation period. The experimental results show that the fresh-keeping films made of the above four embodiments of the present disclosure are superior to the general PE fresh-keeping film in terms of ethylene adsorption ability.

The moisture retention ability of fresh-keeping film is to test the weight and the weight loss rate of fruits and vegetables after packaging by using METTLER TOLEDO ELECTRIC BALANCE machine (model GG4002-S). The lower the weight loss rate of fruit and vegetable packaging over time is, the better the moisture retention ability of the fresh-keeping film is. The experimental results show that the fresh-keeping films made of the above four embodiments of the present disclosure are superior to the general PE fresh-keeping film in terms of moisture retention ability.

The mechanical strength of fresh-keeping film is tested by using SHIMADZU machine (model AG-X). The experimental results show that the mechanical strengths of the fresh-keeping films made of the above four embodiments of the present disclosure are not inferior to the general PE fresh-keeping film.

The tensile strength of fresh-keeping film is tested by using SHIMADZU machine (model AG-X). The experimental results show that the tensile strengths of the fresh-keeping films made of the above four embodiments of the present disclosure are not inferior to the general PE fresh-keeping film

TABLE 1

| evaluation items | fresh-keeping films made of embodiments 1-4 | general PE fresh-keeping film |
|---|---|---|
| bacteriostatic ability | better | worse |
| gas permeability | better | worse |

TABLE 1-continued

| evaluation items | fresh-keeping films made of embodiments 1-4 | general PE fresh-keeping film |
|---|---|---|
| ethylene adsorption ability | better | worse |
| moisture retention ability | better | worse |
| mechanical strength | acceptable | acceptable |
| tensile strength | acceptable | acceptable |

Beneficial Effects of Embodiments

In conclusion, the polymer film for preservation of fruits and vegetables of the present disclosure has better abilities of fresh-keeping of fruits and vegetables, absorbing ethylene aging hormone, and inhibit bacteria and mildew by the technical features of "the first molecular weight is less than the second molecular weight (or the first density is less than the second density), and the first polymer resin material and the second polymer resin material are blended with each other according to a predetermined weight ratio so that the polymer film has a gas penetration rate of between 3.5 g/m$^2$/day and 35 g/m$^2$/day" and "an inorganic nano powder material including zinc oxide (ZnO); wherein the inorganic nano powder material is dispersed in the first polymer resin material and the second polymer resin material in a plurality of granular forms, and an average particle size of the inorganic nano powder material is between 50 nm and 200 nm".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polymer film for preservation of fruits and vegetables, the polymer film comprising:
    a first polymer resin material having a first molecular weight; wherein the first polymer resin material is polyethylene;
    a second polymer resin material having a second molecular weight; wherein the second polymer resin material is polypropylene, the first molecular weight is less than the second molecular weight, and the first polymer resin material and the second polymer resin material are blended with each other according to a predetermined weight ratio of between 3:7 and 7:3 so that the polymer film has a gas penetration rate of between 3.5 g/m$^2$/day and 35 g/m$^2$/day; and
    an inorganic nano powder material including zinc oxide (ZnO), silicon dioxide (SiO$_2$), or silver ions; wherein a content range of the zinc oxide in the inorganic nano powder material is between 10 wt % and 30 wt %, and based on a total weight of the polymer film being 100 wt %, a content range of the inorganic nano powder material is between 6 wt % and 10 wt %; and wherein the inorganic nano powder material is dispersed in the first polymer resin material and the second polymer resin material in a plurality of granular forms, and an average particle size of the inorganic nano powder material is between 50 nm and 200 nm.

2. The polymer film according to claim 1, wherein the first molecular weight of the first polymer resin material is between 10,000 and 20,000, the second molecular weight of the second polymer resin material is between 20,000 and 40,000, and the first polymer resin material and the second polymer resin material are blended with each other according to the weight ratio, so that the polymer film has the gas penetration rate of between 3.5 g/m$^2$/day and 35 g/m$^2$/day.

3. The polymer film according to claim 1, wherein based on a total weight of the polymer film being 100 wt %, a sum of contents of the first polymer resin material and the second polymer resin material is not less than 80 wt %.

4. The polymer film according to claim 1, wherein the polymer film has a first surface and a second surface opposite to the first surface, the polymer film forms a plurality of laser penetration holes, and the plurality of laser penetration holes respectively penetrate through the first surface and the second surface; wherein a density distribution of the plurality of laser penetration holes on the polymer film is between 0.05 and 0.50 per square centimeter, a hole size of each of the laser penetration holes is between 50 micrometers and 90 micrometers, so that the polymer film has the gas penetration rate not less than 10 g/m$^2$/day.

5. The polymer film according to claim 1, wherein the polymer film has a first surface and a second surface opposite to the first surface, a distance between the first surface and the second surface is defined as a thickness of the polymer film, and the thickness is between 10 micrometers and 60 micrometers.

6. The polymer film according to claim 1, further comprising: a plurality of fresh-keeping master batches which are dispersed in the first polymer resin material and the second polymer resin material; wherein each of the fresh-keeping master batches includes a third polymer resin material, and the inorganic nano powder material is dispersed in the third polymer resin material; wherein the third polymer resin material is at least one material selected from the group consisting of polyethylene (PE), polypropylene (PP), polyvinyl chloride (PVC), polyvinylidene chloride (PVDC), polyester (PET), and polymethylpentene (PMP).

7. A polymer film for preservation of fruits and vegetables, the polymer film comprising:
    a first polymer resin material having a first density; wherein the first polymer resin material is polyethylene;
    a second polymer resin material having a second density; wherein the second polymer resin material is polypropylene, the first density is less than the second density, and the first polymer resin material and the second polymer resin material are blended with each other according to a predetermined weight ratio of between 3:7 and 7:3 so that the polymer film has a gas penetration rate between 3.5 g/m$^2$/day and 35 g/m$^2$/day; and
    an inorganic nano powder material including zinc oxide (ZnO), silicon dioxide (SiO$_2$), or silver ions; wherein a content range of the zinc oxide in the inorganic nano powder material is between 10 wt % and 30 wt %, and based on a total weight of the polymer film being 100 wt %, a content range of the inorganic nano powder material is between 6 wt% and 10 wt%; and wherein the inorganic nano powder material is dispersed in the first polymer resin material and the second polymer resin material in a plurality of granular forms, and an average particle size of the inorganic nano powder material is between 50 nm and 200 nm.

8. The polymer film according to claim 7, wherein the first density of the first polymer resin material is between 0.85 g/cm$^3$ and 0.94 g/cm$^3$, the second density of the second polymer resin material is between 0.94 g/cm$^3$ and 1.40 g/cm$^3$, and the first polymer resin material and the second polymer resin material are blended with each other according to the weight ratio, so that the polymer film has the gas penetration rate of between 3.5 g/m$^2$/day and 35 g/m$^2$/day.

9. The polymer film according to claim 7, wherein based on a total weight of the polymer film being 100 wt %, a sum of contents of the first polymer resin material and the second polymer resin material is not less than 80 wt %.

10. The polymer film according to claim 7, wherein the polymer film has a first surface and a second surface opposite to the first surface, the polymer film forms a plurality of laser penetration holes, and the plurality of laser penetration holes respectively penetrate through the first surface and the second surface; wherein a density distribution of the plurality of laser penetration holes on the polymer film is between 0.05 and 0.50 per square centimeter, a hole size of each of the laser penetration holes is between 50 micrometers and 90 micrometers, so that the polymer film has the gas penetration rate not less than 10 g/m$^2$/day.

11. The polymer film according to claim 7, wherein the polymer film has a first surface and a second surface opposite to the first surface, a distance between the first surface and the second surface is defined as a thickness of the polymer film, and the thickness is between 10 micrometers and 60 micrometers.

12. The polymer film according to claim 7, further comprising: a plurality of fresh-keeping master batches which are dispersed in the first polymer resin material and the second polymer resin material; wherein each of the fresh-keeping master batches includes a third polymer resin material, and the inorganic nano powder material is dispersed in the third polymer resin material; wherein the third polymer resin material is at least one material selected from the group consisting of polyethylene (PE), polypropylene (PP), polyvinyl chloride (PVC), polyvinylidene chloride (PVDC), polyester (PET), and polymethylpentene (PMP).

* * * * *